US012028683B2

(12) United States Patent
Guo et al.

(10) Patent No.: US 12,028,683 B2
(45) Date of Patent: Jul. 2, 2024

(54) HEARING AID METHOD AND APPARATUS FOR NOISE REDUCTION, CHIP, HEADPHONE AND STORAGE MEDIUM

(71) Applicant: SHENZHEN GOODIX TECHNOLOGY CO., LTD., Shenzhen (CN)

(72) Inventors: Hongjing Guo, Shenzhen (CN); Lelin Wang, Shenzhen (CN); Guoliang Li, Shenzhen (CN); Xinshan Wang, Shenzhen (CN); Wenkai Han, Shenzhen (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 127 days.

(21) Appl. No.: 17/709,893

(22) Filed: Mar. 31, 2022

(65) Prior Publication Data

US 2022/0225035 A1 Jul. 14, 2022

Related U.S. Application Data

(63) Continuation of application No. PCT/CN2020/075014, filed on Feb. 13, 2020.

(51) Int. Cl.
*H04R 25/00* (2006.01)
*G10K 11/178* (2006.01)

(52) U.S. Cl.
CPC ..... *H04R 25/505* (2013.01); *G10K 11/17873* (2018.01); *G10K 11/17885* (2018.01);
(Continued)

(58) Field of Classification Search
CPC ......................... H04R 1/1083; H04R 2460/01; H04R 25/505; H04R 2225/41; H04R 2225/43;
(Continued)

(56) References Cited

U.S. PATENT DOCUMENTS 10,497,353 B2 * 12/2019 Kulavik ............. G10K 11/1783
2010/0020978 A1 * 1/2010 Garudadri ................ G08B 1/08 381/57
(Continued)

FOREIGN PATENT DOCUMENTS

CN 102915753 A 2/2013
CN 103825993 A 5/2014
(Continued)

OTHER PUBLICATIONS

Office Action in Chinese Application No. 202080001642.7 dated Apr. 2, 2021, 26 pages (With English Translation).
(Continued)

*Primary Examiner* — Norman Yu
(74) *Attorney, Agent, or Firm* — Suiter Swantz IP

(57) ABSTRACT

The present application relates to the field of signal processing, and in particular, to a hearing aid method and apparatus for noise reduction. A hearing aid method for noise reduction, comprising: identifying a scenario where a user is located; and if detection data contains sample data in a sample database corresponding to the scenario, entering a hearing aid mode, and in the hearing aid mode, playing back all or part of external sounds, the external sounds being acquired by a reference microphone; the sample database is a sample sound library, and the sample data is a sample sound; different scenarios correspond to different sample sound libraries; wherein the sample sounds in respective sample sound libraries are configured with priorities; and the sample sounds in the sample sound libraries corresponding to different scenarios have different priorities.

16 Claims, 9 Drawing Sheets

(52) U.S. Cl.
CPC ..... *H04R 25/43* (2013.01); *G10K 2210/1081* (2013.01); *G10K 2210/3027* (2013.01); *H04R 2225/41* (2013.01); *H04R 2225/43* (2013.01); *H04R 2430/01* (2013.01); *H04R 2460/01* (2013.01)

(58) Field of Classification Search
CPC ................ H04R 2430/01; H04R 25/43; G10K 11/17873; G10K 11/17885; G10K 2210/1081; G10K 2210/3027
USPC .... 381/104, 314, 312, 94.1, 317, 56, 57, 58, 381/71.1, 73.1
See application file for complete search history.

(56) References Cited

U.S. PATENT DOCUMENTS

| | | | | |
|---|---|---|---|---|
| 2018/0114331 | A1* | 4/2018 | Wexler | H04L 67/306 |
| 2019/0362738 | A1* | 11/2019 | Mei | G06F 3/165 |

FOREIGN PATENT DOCUMENTS

| | | | |
|---|---|---|---|
| CN | 105100356 | A | 11/2015 |
| CN | 105225662 | A | 1/2016 |
| CN | 105759948 | A | 7/2016 |
| CN | 106445459 | A | 2/2017 |
| CN | 106464751 | A | 2/2017 |
| CN | 106550147 | A | 3/2017 |
| CN | 106601272 | A | 4/2017 |
| CN | 108021349 | A | 5/2018 |
| CN | 105205955 | A | 7/2018 |
| CN | 109257498 | A | 1/2019 |
| CN | 109493884 | A | 3/2019 |
| CN | 108777827 | A | 12/2019 |
| CN | 111028834 | A | 4/2020 |
| CN | 110708630 | B | 9/2021 |
| WO | 2018045536 | A1 | 3/2018 |

OTHER PUBLICATIONS

Search Report in International Application No. PCT/CN2020/075014 dated Nov. 5, 2020, 7 pages (With English Translation).

* cited by examiner

HEARING AID METHOD AND APPARATUS FOR NOISE REDUCTION, CHIP, HEADPHONE AND STORAGE MEDIUM

PRIORITY

The present application constitutes a bypass continuation of International Application PCT/CN2020/075014, filed on Feb. 13, 2020, which is incorporated herein by reference in the entirety.

TECHNICAL FIELD

The present disclosure relates to the field of signal processing, and in particular, to a hearing aid method and apparatus for noise reduction, a chip, headphones, and a storage medium.

BACKGROUND

When users are in noisy streets, external noise may greatly affect the experience of using electronic devices. Major manufacturers and companies at home and abroad have put forward various solutions to reduce noise interference, mainly through the following two manners. In a first manner, a headphone structure is designed, for example, noise is physically isolated by using a sound insulation material, such as by using ear muffs, earplugs, or covering the ears. In a second manner, in order to eliminate the influence of noise, a signal processing technology is used to generate a speech in a sound field space inside headphones through a plurality of microphones to be opposite to an external noise signal, i.e., an active noise reduction technology. The noise reduction technology mentioned above also brings problems. For example, when listening to music on a road with noise reduction headphones, a user may not be able to hear honks or sirens on the road, or the user may have to take the headphones off when someone is talking to him/her, which may cause the user to ignore such sounds of interest. In the prior art, in order to solve the problems, when a sound of interest is detected, the sound of interest is played back so that the user can hear the sound of interest even being equipped with the noise reduction headphones, which may be called monitor/talk through/hear through or hearing aid. However, this method is not applicable to various application scenarios. If triggering conditions of a hearing aid mode are the same for all scenarios, the user may enter the hearing aid mode when the user does not expect to enter the hearing aid mode, and does not enter the hearing aid mode when the user expects to enter the hearing aid mode. For example, the user may be interested in different sounds in different scenarios. In a sleep scenario, the user may not want to be disturbed by others, even if someone calls his/her name, the user does not want keywords of the "name" to be transmitted into the ears. In other scenarios, such as an office scenario, the user wants to hear the keywords of the "name". The hearing aid technology in the prior art is not applicable to various application scenarios or scenario changes.

SUMMARY

With respect to the problem of hearing aid methods for noise reduction in the prior art not being applicable to various application scenarios, the present disclosure provides a hearing aid method and apparatus for noise reduction, a chip, headphones, and a storage medium.

In a first aspect of embodiments of the present disclosure, a hearing aid method for noise reduction is provided, and the method includes steps of: identifying a scenario where a user is located; and entering a hearing aid mode based on that detection data contains sample data in a sample database corresponding to the scenario, and playing back all or part of external sounds in the hearing aid mode, the external sounds being acquired by a reference microphone.

In addition, combined with the first aspect, in an embodiment of the first aspect, the detection data is the external sounds, the sample database is a sample sound library, and the sample data is a sample sound; or the detection data is heart rate signals, the sample database is a sample heart rate library, and the sample data is a sample heart rate.

In addition, combined with the first aspect, in an embodiment of the first aspect, different scenarios correspond to different sample sound libraries; or different scenarios correspond to different sample heart rate libraries.

In addition, combined with the first aspect, in an embodiment of the first aspect, the sample sounds in respective sample sound libraries are configured with priorities; and the sample sounds in the sample sound libraries corresponding to different scenarios have different priorities.

In addition, combined with the first aspect, in an embodiment of the first aspect, the step of playing back part of external sounds includes: playing back a target sound corresponding to the sample sound in the external sounds.

In addition, combined with the first aspect, in an embodiment of the first aspect, prior to the step of playing back a target sound corresponding to the sample sound in the external sounds, the method further includes: separating the target sound corresponding to the sample sound from the external sounds; and increasing a gain of the target sound.

In addition, combined with the first aspect, in an embodiment of the first aspect, based on that the external sounds contain a plurality of sample sounds in the sample sound library corresponding to the scenario, the step of playing back a target sound corresponding to the sample sound in the external sounds includes: playing back the target sound corresponding to one of the plurality of sample sounds.

In addition, combined with the first aspect, in an embodiment of the first aspect, the step of playing back the target sound corresponding to one of the plurality of sample sounds includes: selecting, based on that the external sounds contain a first sample sound and a second sample sound in the sample sound library corresponding to the scenario, the target sound corresponding to the first sample sound fir playback based on the priorities of the first sample sound and the second sample sound; the priority of the first sample sound being higher than that of the second sample sound.

In addition, combined with the first aspect, in an embodiment of the first aspect, the sample sound includes one or more of: ambient sounds, keywords or voiceprint information. The keywords include one or more of: appellations or greetings; and the ambient sounds include one or more of alarms, crashes, explosions, building collapses, car horns or broadcasts.

In addition, combined with the first aspect, in an embodiment of the first aspect, the scenario includes one or more of: an office scenario, a home scenario, an outdoor scenario or a travel scenario, or the scenario includes one or two of: a static scenario and an exercise scenario; the ambient sound in the sample sound library corresponding to the office scenario is one or more of: alarms, explosions, building collapses or broadcasts; the ambient sound in the sample sound library corresponding to the outdoor scenario and the travel scenario is one or more of: alarms, crashes, explosions, building collapses, car horns or broadcasts; the ambient sound in the sample sound library corresponding to the home scenario is one or more of: alarms, explosions or building collapses; the sample heart rate in the sample heart rate library corresponding to the exercise scenario is a heart rate signal of more than 200 beats/min or less than 60 beats/min; and the sample heart rate in the sample heart rate library corresponding to the static scenario is a heart rate signal of more than 120 beats/min or less than 50 beats/min.

In addition, combined with the first aspect, in an embodiment of the first aspect, the priority of the ambient sound in the sample sound in the sample sound library corresponding to the scenario is higher than the priority/priorities of one or more of the keywords or the voiceprint information.

In addition, combined with the first aspect, in an embodiment of the first aspect, subsequent to the step of identifying a scenario where a user is located, the method further includes: judging whether the external sounds contain the sample sound in the sample sound library corresponding to the scenario, or judging whether the heart rate signal belongs to the sample heart rate in the sample heart rate library corresponding to the scenario.

In addition, combined with the first aspect, in an embodiment of the first aspect, a weight of the sample sound is configured based on the priority of the sample sound, and the higher the priority of the sample sound, the greater the weight of the sample sound; and the step of judging whether the external sounds contain the sample sound in the sample sound library corresponding to the scenario includes: determining that the external sounds contain the sample sound in the sample sound library corresponding to the scenario based on that a cumulative sum of intensity of each sample sound contained in the external sounds multiplied by a respective weight is greater than a preset value.

In addition, combined with the first aspect, in an embodiment of the first aspect, the method further includes: establishing the sample sound library corresponding to the scenario or establishing the sample heart rate library corresponding to the scenario. The step of establishing the sample sound library corresponding to the scenario including one of more of inputting the sample sound to the sample sound library, deleting the sample sound, and adjusting the priority of the sample sound based on the scenario; and the step of establishing the sample heart rate library corresponding to the scenario including: inputting the sample heart rate to the sample heart rate library, or deleting the sample heart rate based on the scenario.

In addition, combined with the first aspect, in an embodiment of the first aspect, the method further includes: in response to the hearing aid mode being entered, increasing a playback volume of all or part of external sounds to a preset volume value within a preset time period when playing back all or part of external sounds.

In addition, combined with the first aspect, in an embodiment of the first aspect, in the hearing aid mode, noise reduction intensity of a noise reduction mode is maintained or reduced; and in the noise reduction mode, the external sounds are canceled by using an active noise reduction technology.

In a second aspect of embodiments of the present disclosure, a hearing aid apparatus for noise reduction is provided, and the apparatus includes: a scenario identification module configured to identify a scenario where a user is located; a hearing aid module configured to enter a hearing aid mode based on that detection data contains sample data in a sample database corresponding to the scenario; and a playback module configured to play back all or part of external sounds in the hearing aid mode, the external sounds being acquired by a reference microphone.

In addition, combined with the second aspect, in an embodiment of the second aspect, the detection data is the external sounds, the sample database is a sample sound library, and the sample data is a sample sound; or the detection data is heart rate signals, the sample database is a sample heart rate library, and the sample data is a sample heart rate.

In addition, combined with the second aspect, in an embodiment of the second aspect, different scenarios correspond to different sample sound libraries; or different scenarios correspond to different sample heart rate libraries.

In addition, combined with the second aspect, in an embodiment of the second aspect, the apparatus further includes a priority configuration module configured to configure priorities for the sample sounds in the sample sound libraries, the sample sounds in the sample sound libraries corresponding to different scenarios have different priorities.

In addition, combined with the second aspect, in an embodiment of the second aspect, when playing back part of the external sounds, the playback module plays back a target sound corresponding to the sample sound in the external sounds.

In addition, combined with the second aspect, in an embodiment of the second aspect, the apparatus further includes a separation module and an enhancement module. The separation module and the enhancement module are connected to the playback module; the separation module is configured to separate the target sound corresponding to the sample sound from the external sounds; and the enhancement module is configured to increase a gain of the target sound.

In addition, combined with the second aspect, in an embodiment of the second aspect, based on that the external sounds contain a plurality of sample sounds in the sample sound library corresponding to the scenario, when playing back a target sound corresponding to the sample sound in the external sounds, the playback module plays back the target sound corresponding to one of the plurality of sample sounds.

In addition, combined with the second aspect, in an embodiment of the second aspect, when the playback module plays back the target sound corresponding to one of the plurality of sample sounds, the playback module selects, based on that the external sounds contain a first sample sound and a second sample sound in the sample sound library corresponding to the scenario, the target sound corresponding to the first sample sound for playback based on the priorities of the first sample sound and the second sample sound; and the priority of the first sample sound being higher than the priority of the second sample sound.

In addition, combined with the second aspect, in an embodiment of the second aspect, the sample sound includes one or more of ambient sounds, keywords or voiceprint information; the keywords include one or more of: appellations or greetings; and the ambient sounds include one or more of: alarms, crashes, explosions, building collapses, car horns or broadcasts.

In addition, combined with the second aspect, in an embodiment of the second aspect, the scenario includes one or more of: an office scenario, a home scenario, an outdoor scenario or a travel scenario, or the scenario includes one or two of: a static scenario and an exercise scenario; the ambient sound in the sample sound library corresponding to the office scenario is one or more of: alarms, explosions, building collapses or broadcasts; the ambient sound in the sample sound library corresponding to the outdoor scenario and the travel scenario is one or more of: alarms, crashes, explosions, building collapses, car horns or broadcasts; the ambient sound in the sample sound library corresponding to the home scenario is one or more of: alarms, explosions or building collapses; the sample heart rate in the sample heart rate library corresponding to the exercise scenario is a heart rate signal of more than 200 beats/min or less than 60 beats/min; and the sample heart rate in the sample heart rate library corresponding to the static scenario is a heart rate signal of more than 120 beats/min or less than 50 beats/min.

In addition, combined with the second aspect, in an embodiment of the second aspect, the priority configuration module is further configured to configure the priority of the ambient sound in the sample sound in the sample sound library corresponding to the scenario to be higher than the priority/priorities of one or more of the keywords or the voiceprint information.

In addition, combined with the second aspect, in an embodiment of the second aspect, the apparatus further includes a judgment module. The judgment module is connected to the scenario identification module; and the judgment module is configured to judge whether the external sounds contain the sample sound in the sample sound library based on the scenario, or judge whether the heart rate signal belongs to the sample heart rate in the sample heart rate library based on the scenario.

In addition, combined with the second aspect, in an embodiment of the second aspect, the priority configuration module is further configured to configure a weight of the sample sound according to the priority of the sample sound, and the higher the priority of the sample sound, the greater the weight of the sample sound; and the judgment module determines that the external sounds contain the sample sound in the sample sound library corresponding to the scenario based on that a cumulative sum of intensity of each sample sound contained in the external sounds multiplied by a respective weight is greater than a preset value.

In addition, combined with the second aspect, in an embodiment of the second aspect, the apparatus further includes a library establishment module configured to establish the sample sound library corresponding to the scenario or establish the sample heart rate library corresponding to the scenario. The library establishment module further includes one or more of: an input module, a deletion module or an adjustment module; the input module, the deletion module and the adjustment module are respectively configured to input the sample sound to the sample sound library, delete the sample sound and adjust the priority of the sample sound according to the scenario; or the input module and the deletion module are respectively configured to input the sample heart rate to the sample heart rate library and delete the sample heart rate according to the scenario.

In addition, combined with the second aspect, in an embodiment of the second aspect, a playback volume of all or part of external sounds played back by the playback module is increased to a preset volume value within a preset time period.

In addition, combined with the second aspect, in an embodiment of the second aspect, the apparatus further includes a noise reduction module. The noise reduction module is configured to maintain or reduce noise reduction intensity of a noise reduction mode in the hearing aid mode, and cancel the external sounds by using an active noise reduction technology in the noise reduction mode.

In a third aspect of embodiments of the present disclosure, a chip is provided, and the chip is configured to perform a hearing aid method for noise reduction. The chip includes a memory and a processor; the memory is coupled to the processor; the memory is configured to store program instructions; and the processor is configured to invoke the program instructions stored in the memory, to cause the chip to perform the hearing aid method for noise reduction according to the first aspect.

In a fourth aspect of embodiments of the present disclosure, headphones are provided, and the headphones include the chip according to the third aspect.

In a fifth aspect of embodiments of the present disclosure, a computer-readable storage medium is provided, and the computer-readable storage medium stores a computer program. When the computer program is executed by a processor, the hearing aid method for noise reduction according to the first aspect is performed.

Compared with the prior art, the embodiments of the present disclosure have the following beneficial effects. The embodiments of the present disclosure provide a hearing aid method for noise reduction, in which a scenario where a user is located is identified, and based on that detection data contains sample data in a sample database corresponding to the scenario, a hearing aid mode is entered to adapt to changes in the scenario where the user is located, as well as improve the user experience.

BRIEF DESCRIPTION OF DRAWINGS

In order to better illustrate the technical solutions in the embodiments of the present disclosure or the prior art, the accompanying drawings used in the description of the embodiments or the prior art will be briefly introduced below. It is apparent that the accompanying drawings in the following description are only some embodiments of the present disclosure, and other drawings can be obtained by those of ordinary skill in the art from the provided drawings without creative efforts.

DESCRIPTION OF EMBODIMENTS

In order to make the objectives, technical solutions and advantages of the present disclosure clearer, the following is a detailed description of some embodiments of the present disclosure in the form of examples combined with the accompanying drawings. However, those of ordinary skill in the art may understand that, in the examples, numerous technical details are set forth in order to enable a reader to better understand the present disclosure. However, the technical solutions claimed in the present disclosure can be implemented without these technical details and various changes and modifications based on the embodiments below.

Figure 1:
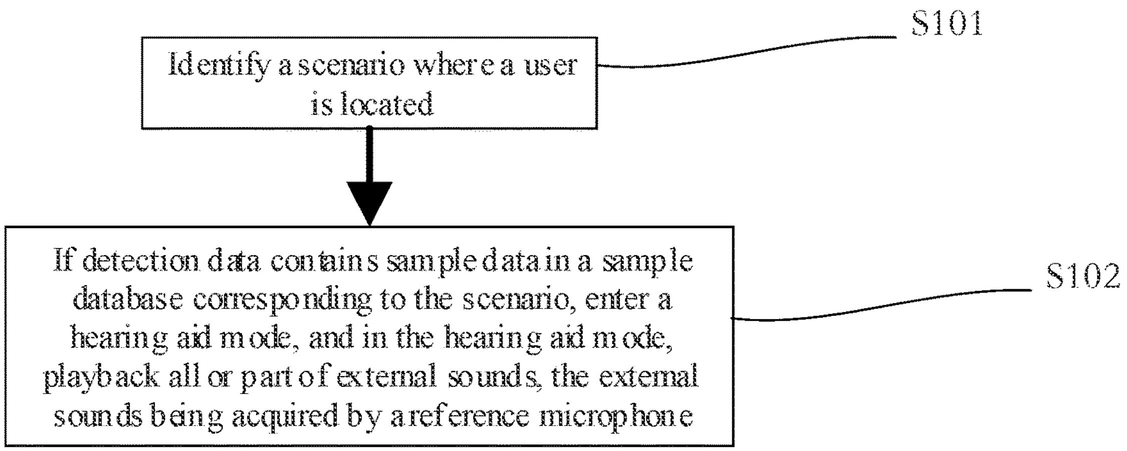
FIG. 1 is a flowchart of a hearing aid method for noise reduction according to an embodiment of the present disclosure.

An embodiment of the present disclosure provides a hearing aid method for noise reduction. The hearing aid method may be used in various types of noise reduction headphones, such as ear-worn headphones, head-mounted headphones, in-ear headphones and semi-in-ear headphones. The headphones may communicate with electronic devices such as mobile phones, tablets, computers and TVs either wiredly or wirelessly. Referring to FIG. 1, FIG. 1 is a flowchart of a hearing aid method for noise reduction according to an embodiment of the present disclosure. The method includes the following steps.

In S101, a scenario where a user is located is identified.

In S102, if detection data contains sample data in a sample database corresponding to the scenario, a hearing aid mode is entered, and in the hearing aid mode, all or part of external sounds is played back, the external sounds being acquired by a reference microphone.

In step S101, the scenario where the user is located is identified. The scenario may include an indoor scenario or an outdoor scenario based on the user's geographical location. For example, whether the user is in the indoor scenario or the outdoor scenario may be positioned and identified by using a Global Positioning System (GPS). Further, the indoor scenario may include a home scenario or an office scenario. For example, the scenario where the user is located may be identified as the office scenario through the user's clock-in information, or the scenario where the user is located may be identified as the home scenario by the user's opening a door lock on an APP. In addition, the indoor scenario may further include a travel scenario, for example, in an airport or a subway station, which may be determined by, for example, the user's swiping his/her metrocard or ticket information in the APP. Certainly, a user state may also be determined by a smart assistant built-in a mobile phone (including user schedule management, schedule, alarm clock, etc.). According to the user's motion state, the scenario may include an exercise scenario or a static scenario. In the embodiments, the scenario where the user is located may be identified by using a speed sensor, a temperature sensor, an air pressure sensor or a heart rate sensor, and by using one or more technologies such as GPS, machine learning and computer vision. In the embodiments, the specific technology of identifying the scenario where the user is located is not limited, which may be selected as required. A number of scenarios is not limited, which may be one or more, and the user may define various scenarios as required.

In step 102, the reference microphone functions to acquire external sounds, which may be understood as sounds in surrounding environments of the user. The external sounds may, also be understood as external noise. However, in some scenarios, the external noise may contain useful information, such as car horns, or announcements of subway stops, which are sounds that the user is interested in. The reference microphone in the embodiments may be provided on the headphones, for example, at a position away from the user's mouth to prevent acquisition of the user's own sound.

In the embodiments, each scenario corresponds to a corresponding sample database. Sample data is stored in the sample database. Generally, after a scenario is determined, a sample database corresponding to the scenario is also determined. Therefore, after the scenario where the user is located is determined, a condition for starting a hearing aid mode is also determined. For example, within a first time period, if the user is identified to be in a first scenario, and if sample data in a sample database corresponding to the scenario includes first sample data, the hearing aid mode is entered if detection data contains the first sample data. Within a second time period, the user is in a second scenario, and if a sample sound library corresponding to the scenario does not include the first sample data, the hearing aid mode may not be entered if the detection data contains the first sample data, so that the user can avoid hearing uninterested sounds. The scenario may change from time to time, and in different scenarios, the user's requirements on the condition of entering the hearing aid mode often vary. For example, if, in Scenario A, the user is interested in sample data a1, sample data in a sample database corresponding to Scenario A may be set to include a1. If the detection data contains a1 in the sample database corresponding to Scenario A, the hearing aid mode is entered. If, in Scenario B, the user is interested in sample data b1, sample data in a sample database corresponding to Scenario B may be se to include b1. If the detection data contains b1 in the sample database corresponding to Scenario B, the hearing aid mode is entered. In this way, each scenario has a corresponding sample sound library, which may adapt to changing requirements of a user and may also adapt to requirements of different users. The detection data in the embodiments may be understood as detected data, that is, acquired data, which may be detected audio data or biometric data, etc.

If the hearing aid mode is entered, the user may obtain outside sounds in the hearing aid mode. All or part of external sounds may be played back. The part of the external sounds may be separated from all the external sounds. The part of the external sounds may be sounds that the user is interested in. In the embodiments, all or part of external sounds may be played back through an in-ear microphone, for example, through a music playing channel. That is, all or part of external sounds is played back while music is played.

In the embodiments, when the hearing aid mode is entered, music playing may be stopped, or a music playing volume may be maintained or lowered. When the music playing volume is lowered or the music playing is stopped, the user pays more attention to all or part of external sounds played back by a loudspeaker, thereby improving a warning effect.

The embodiments of the present disclosure provide a hearing aid method for noise reduction, in which a scenario where a user is located is identified, and if detection data contains sample data in a sample database corresponding to the scenario, a hearing aid mode is entered to adapt to changes in the scenario where the user is located, as well as improve the user experience.

Based on the contents disclosed in the above-mentioned embodiments, in the embodiments, the detection data is the external sounds, the sample database is a sample sound library, and the sample data is a sample sound.

Figure 2:
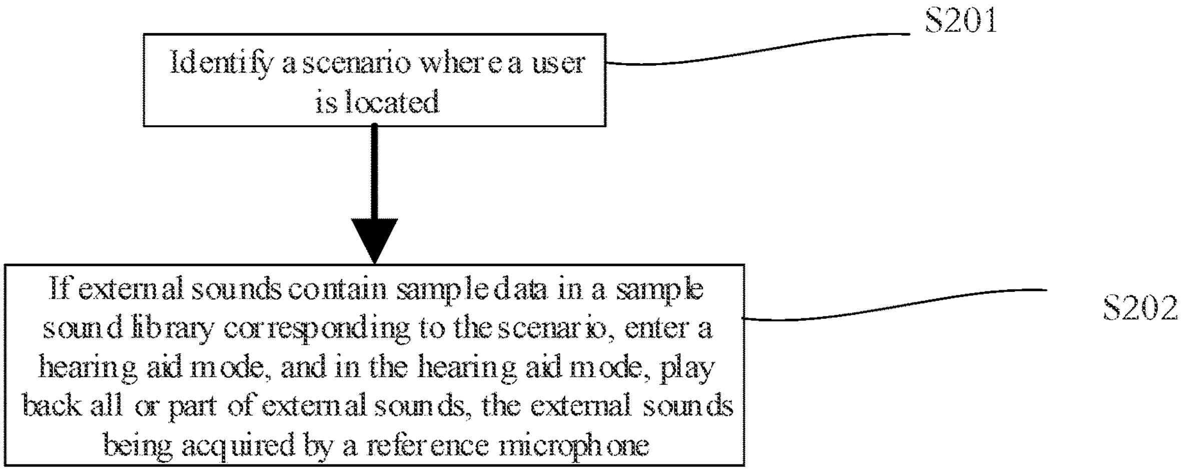
FIG. 2 is a flowchart of another hearing aid method for noise reduction according to an embodiment of the present disclosure.

Referring to FIG. 2, FIG. 2 is a flowchart of a hearing aid method for noise reduction according to an embodiment of the present disclosure. The method includes the following steps.

In S201, a scenario where a user is located is identified.

In S202, if external sounds contain sample data in a sample sound library corresponding to the scenario, a hearing aid mode is entered, and in the hearing aid mode, all or part of external sounds is played back, the external sounds being acquired by a reference microphone.

Step 201 is the same as or similar to step 101 described above. The scenario includes an indoor scenario, an outdoor scenario and a travel scenario. The indoor scenario may include an office scenario, a home scenario and the like. The home scenario may include a sleep scenario. The travel scenario may include taking planes, trains, subways, buses and other means of transportation. Identification of user scenarios is to meet different requirements of users in various scenarios, so that the scenarios may have their own sample sound libraries. In the embodiments, the scenario where the user is located may be identified by using a speed sensor, a temperature sensor, an air pressure sensor or a heart rate sensor, and by using one or more technologies such as GPS, machine learning and computer vision. In the embodiments, the specific technology of identifying the scenario where the user is located is not limited, which may be selected as required.

In the embodiments, each scenario corresponds to a corresponding sample sound library. Sample data is stored in the sample sound library. Generally, after a scenario is determined, a sample sound library corresponding to the scenario is also determined. Therefore, after the scenario where the user is located is determined, a condition for starting a hearing aid mode is also determined. For example, within a first time period, if the user is in an outdoor scenario, and if sample data in a sample sound library corresponding, to the scenario includes car horns, the hearing aid mode is entered if external sounds contain the car horns. Within a second time period, the user is in a home scenario, and if a sample sound library corresponding to the scenario does not include the car horns, the hearing aid mode may not be entered if the external sounds contain the car horns, for example, a toy generates car horns, or car horns on a street are transmitted into a room, the user can avoid hearing uninterested sounds. The scenario may change from time to time, and sounds that users are interested in vary from scene to scene. For example, in a sleep scenario, various keywords may not be sounds that the user is interested in. In the sleep scenario, the sound of interest may include various alarms. In the embodiments, sample sound libraries corresponding to different scenes may be the same or different. For example, if the user does not mind being disturbed in the sleep scenario, the sample sound in the sample sound library corresponding to the sleep scenario may be the same as the sample sound in the sample sound library corresponding to the office scenario, and may include same keywords. That is, two scenarios may correspond to a same sample sound library. If the user does not want to be disturbed in the sleep scenario, the corresponding sample sound library in the sleep scenario may not include various keywords. Each scenario corresponds to a sample sound library, which may adapt to changing requirements as well as requirements of different users.

After the scenario where the user is located is identified, the hearing aid mode is entered if the external sounds contain sample sounds in the sample sound library corresponding to the scenario. For example, if the scenario where the user is located is identified as an office scenario, assuming that the sample sound in the sample sound library includes alarms, and the external sounds contain alarms, such as fire alarms, the hearing aid mode is entered, so that the user can obtain outside sounds. In the hearing aid mode, all the external sounds may be played back. For example, if the user is located in the office scenario, and if the external sounds include the fire alarms, all sounds acquired by the reference microphone may be played back, which may also include cries for help or conversations between colleagues. In the hearing aid mode, part of the external sounds may be played back. For example, only the fire alarms may be played back to provide sufficient warning.

Figure 3:
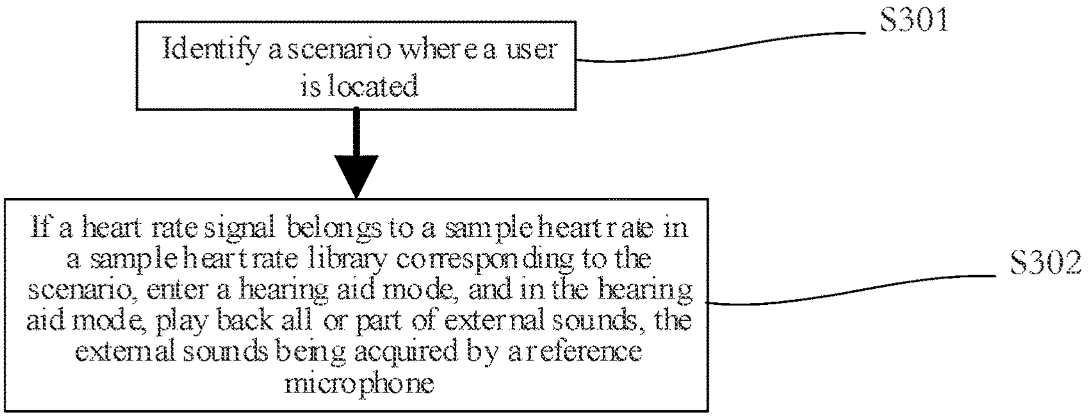
FIG. 3 is a flowchart of yet another hearing aid method for noise reduction according to an embodiment of the present disclosure.

Based on the contents disclosed in the above-mentioned embodiments, in the embodiments, the detection data is heart rate signals, the sample database is a sample heart rate library, and the sample data is a sample heart rate. As shown in FIG. 3, the method includes the following steps.

In S301, a scenario where a user is located is identified.

In S302, if a heart rate signal belongs to a sample heart rate in a sample heart rate library corresponding to the scenario, a hearing aid mode is entered, and in the hearing aid mode, all or part of external sounds is played back, the external sounds being acquired by a reference microphone.

In the embodiments, the detection data may be detected through a heart rate sensor. When the user's heart rate is in an abnormal range, the hearing aid mode is entered. The abnormal range may be a range of possible lesions in the user's body that is generally considered medically. If it is judged, only based on whether the user's heart rate is in a normal range, whether the hearing aid mode is entered, it may be inaccurate. For example, during strenuous exercise, a heart rate value is high and may be in an abnormal range. If the hearing aid mode is entered in this case, the user may be disturbed by external sounds during the strenuous exercise. Therefore, the sample heart rate library corresponding to the scenario is required to be determined according to the scenario. In step 301, the scenario may include an exercise scenario, a static scenario and the like. In the embodiments, whether the user is located in the exercise scenario or the static scenario may be identified according to step-counting data on an APP or in other manners. For example, if a number of steps increases faster than a predetermined speed, it may be determined that the user is in the exercise scenario. When the number of steps increases slower than the predetermined speed, it may be determined that the user is in the static scenario. When the user may be in a dangerous state, for example, when the user's heart rate signal is abnormal, the hearing aid mode is required to be turned on to keep a communication channel between the user and the outside world unblocked. However, in different scenarios, the user's heart rates are different. For example, in the exercise scenario, the heart rate is generally faster when the user runs or rides a bike, while in the static scenario, the heart rate is generally slow. In order to adapt to different scenarios, each scenario may be configured with a corresponding sample heart rate library. In the embodiments, the scenario where the user is located, for example, an exercise scenario or a static scenario, is required to be identified. In other embodiments, other scenarios may also be set according to user requirements, or the scenario is further classified. For example, the exercise scenario is further classified as a small exercise scenario, a medium exercise scenario or a large exercise scenario. In the embodiments, the scenario where the user is located may be identified through one or more sensors such as a speed sensor, an acceleration sensor, a pedometer or a GPS. Whether the user is in a gym, at home or at work may be identified through the GPS, so as to identify whether the user is doing exercise or at rest. If one identification manner is insufficient to identify the scenario where the user is located, a combination of a plurality of identification manners may also be used. The identification manner is not limited in the embodiments. In the embodiments, when judging whether the heart rate signal belongs to a sample heart rate in a sample heart rate library corresponding to the scenario, judgment may be performed multiple times. That is, if a number of times of detection that the heart rate signal belongs to the sample heart rate in the sample heart rate library exceeds a preset number of times, the hearing aid mode may be entered. If the number of times of detection that the heart rate signal belongs to the sample heart rate in the sample heart rate library does not exceed the preset number of times, the user may select whether to enter the hearing aid mode. Such a configuration of a plurality of times of detection is to prevent false detection, so as to further improve the user experience. In the embodiments, after the hearing aid mode is entered, the user may also select whether to turn off a noise reduction mode or adjust noise reduction intensity in the noise reduction mode by default.

Figure 3A:
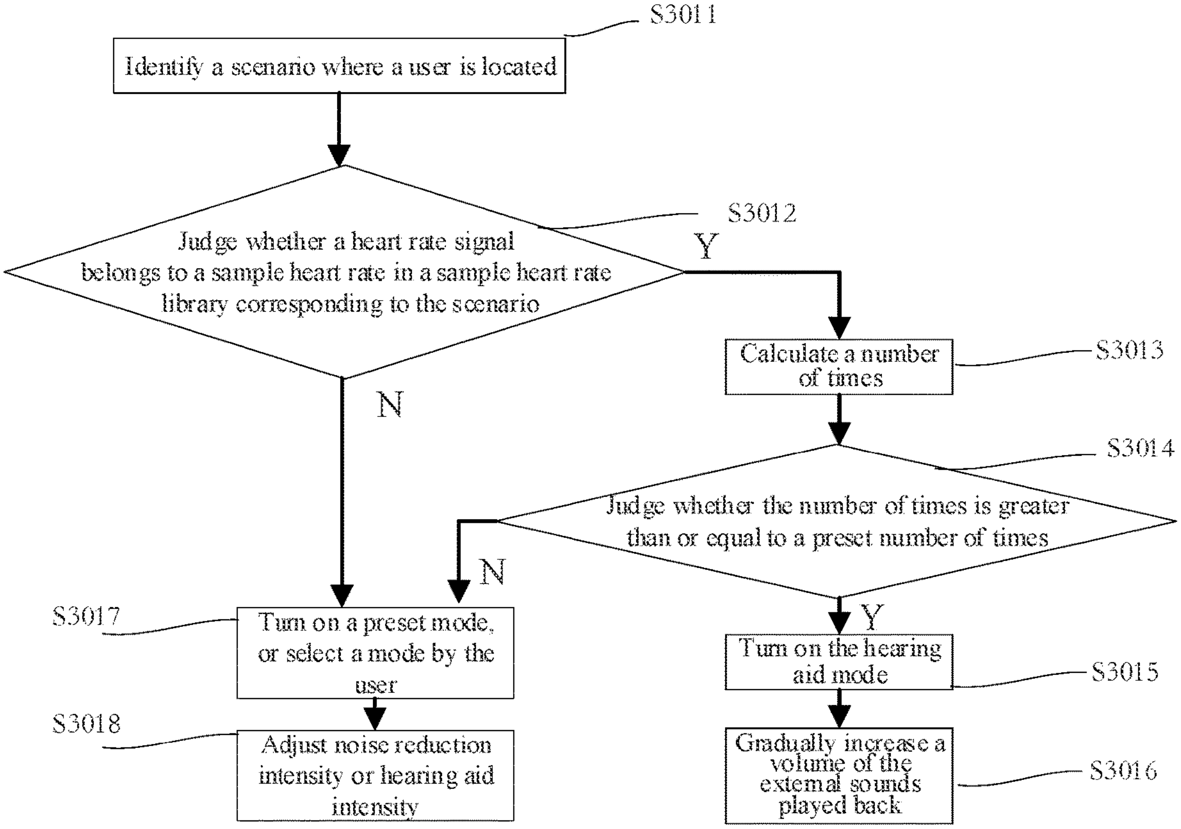
FIG. 3A is a flowchart of yet another hearing aid method for noise reduction according to an embodiment of the present disclosure.

Referring to FIG. 3A, in the embodiments, S3011 is the same as or similar to step S301 in the above-mentioned embodiments, and is not described in detail in the embodiments. In S3012, it is judged whether a heart rate signal belongs to a sample heart rate in a sample heart rate library corresponding to the scenario. If the heart rate signal belongs to the sample heart rate in the sample heart rate library, step S3015 may be directly performed to turn on a hearing aid mode. If the heart rate signal does not belong to the sample heart rate in the sample heart rate library, a preset mode may be turned on or the user selects a mode. The preset mode may be a noise reduction mode or the hearing aid mode, or the noise reduction mode and the hearing aid mode may be turned on at the same time. In addition, if the heart rate signal belongs to the sample heart rate in the sample heart rate library corresponding to the scenario, step S3013 may be performed, in which a number of times is calculated. This number of times is a number of times of judgment that the heart rate signal belongs to the sample heart rate in the sample heart rate library corresponding to the scenario. After the number of times is calculated, S3014 is performed, and if the number of times is greater than or equal to a preset number of times, S3015 is performed to turn on the hearing aid mode. In the embodiments, false alarms may be prevented by calculating the number of times and judging whether the number of times is greater than or equal to the preset number of times. That is, the turn-on of the hearing aid mode due to false detection can be prevented. In the embodiments, calculating a slumber of times may also be understood as calculating a duration in which the heart rate signal belongs to the sample heart rate in the sample heart rate library corresponding to the scenario. If the duration exceeds or equals a preset duration, the hearing aid mode may also be turned on. If the number of times is less than the preset number of times, the preset mode may be turned on or the user selects a mode. After receiving a reminder of selecting a mode, the user may select the hearing aid mode or the noise reduction mode as required, or select turning on the hearing aid mode and the noise reduction mode at the same time, to achieve the coordination between hearing aid and noise reduction. In this way, useful information from the outside world may be heard while noise reduction is achieved. After step S3017, step S3018 may also be performed to adjust noise reduction intensity or hearing aid intensity. For example, a hearing aid gain or algorithm parameters or the noise reduction intensity may be changed, or different healing aid gains may be used in different frequency bands, so as to bring better user experience. In the embodiments, after step S3015, step S3016 may be performed to gradually increase a volume of the external sounds played back to realize a fade-in and fade-out function, so that the user is comfortable during mode switching and will not hear the external sounds with a higher volume when first entering the hearing aid mode.

The embodiments of the present disclosure provide a hearing aid method for noise reduction, in which a scenario where a user is located is identified, and if external sounds contain a sample sound in a sample sound library corresponding to the scenario or a heart rate signal belongs to a sample heart rate in a sample heart rate library corresponding to the scenario, a hearing aid mode is entered to adapt to changes in the scenario where the user is located, as well as improve the user experience.

Based on the contents disclosed in the above-mentioned embodiments, in the embodiments, different scenarios correspond to different sample sound libraries. In the embodiments, the user is interested in different sounds in different scenarios. For example, in the indoor scenario, car horns are not sounds that the user is interested in, because the car horns are most likely from a TV or toy, or because a house is not good in sound insulation, car horns on a road may be acquired by the reference microphone. However, if a sample sound library corresponding to the indoor scenario does not include car horns, the hearing aid mode may not be entered even if the car horns on the road are acquired by the reference microphone, so as to prevent the user's hearing an uninterested sound. In the outdoor scenario, car horns are sounds that the user is interested in. Therefore, the sample sound in the sample sound library corresponding to the outdoor scenario may include the car horns.

Generally, a normal human has a heart rate ranging from 60 to 100 beats/min at rest and a heart rate generally ranging from 120 to 180 beats/min when doing exercise. The exercise scenario may be further classified as a small amount of exercise ranging from 120 to 140 beats/min, a medium amount of exercise ranging from 141 to 160 beats/min and a large amount of exercise ranging from 161 to 180 beats/min. Therefore, the sample heart rate libraries may be set differently in different scenarios, and then triggering conditions of the hearing aid mode are different in different scenarios.

Based on the contents disclosed in the above-mentioned embodiments, in the embodiments, different scenarios corresponding to different sample sound libraries include: the respective numbers of sample sounds in the sample sound libraries corresponding to different scenarios are different. In different scenarios, the respective numbers of sounds that the user is interested in are generally different. For example, in the outdoor scenario, the number of sample sounds in the sample sound library is larger; in the home scenario, the number of sample sounds in the sample sound library is smaller; and in the sleep scenario, the number of sample sounds in the sample sound library may be even smaller.

Based on the contents disclosed in the above-mentioned embodiments, in the embodiments, the sample sounds in the sample sound libraries are configured with priorities. In the embodiments, the sample sound library includes more than one sample sound. When the sample sound library includes a plurality of sample sounds, each sample sound is configured with a priority, to distinguish the user's levels of interest in different sample sounds. Certainly, when samples in the sample sound libraries are configured with priorities, the priorities configured for the plurality of sample sounds may be the same or different, which is not limited in the embodiments. In the embodiments, the sample sounds in the sample sound libraries corresponding to different scenarios may have different priorities. For example, sample sounds in the sample sound library corresponding to the office scenario and sample sounds in the sample sound library corresponding to the outdoor scenario may each include the user name. Such a sample sound as the user name in the office scenario may have a higher priority than the user name in the sample sound library corresponding to the outdoor scenario. In the embodiments, the priorities may be represented by weights or by levels, which is not limited in the embodiments.

Figure 4:
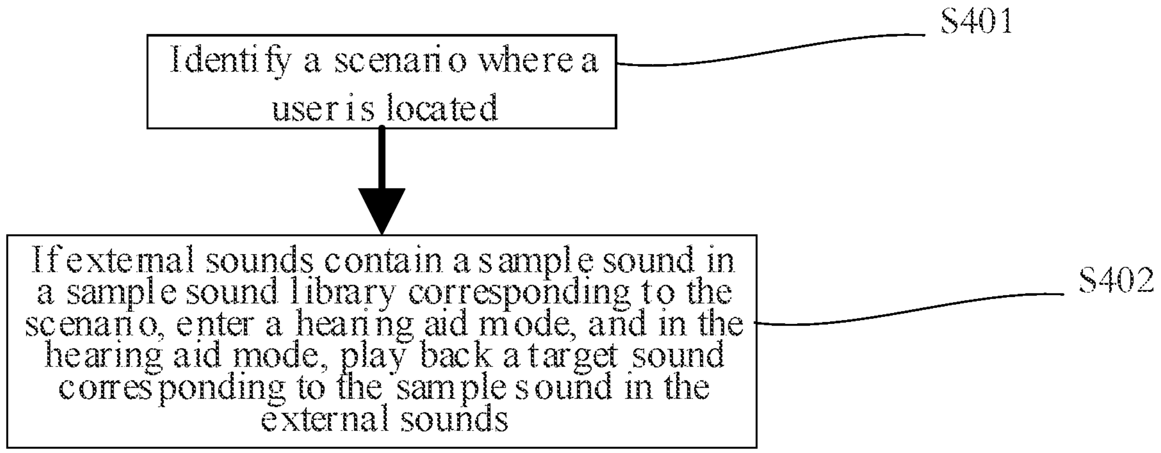
FIG. 4 is a flowchart of yet another hearing aid method for noise reduction according to an embodiment of the present disclosure.

Based on the contents disclosed in the above-mentioned embodiments, in the embodiments, the step of playing back part of external sounds includes: playing back a target sound corresponding to the sample sound in the external sounds. Referring to FIG. 4, in the embodiments, S401 is the same as or similar to step S201 in the above-mentioned embodiments, and is not described in detail in the embodiments. After the scenario where the user is located is identified in step S401, step S402 is performed, in which the hearing aid mode is entered if the external sounds contain sample sounds in the sample sound library corresponding to the scenario, and in the hearing aid mode, a target sound corresponding to the sample sound in the external sounds is played back. For example, if the scenario where the user is located is identified as an office scenario, assuming that the sample sound in the sample sound library includes alarms, such as fire alarms, and the external sounds contain the fire alarms, the hearing aid mode is entered, so that the user can obtain outside sounds. In the hearing aid mode, only the fire alarms in the external sounds may be played back. In the hearing aid mode, the target sound corresponding to the sample sound in the external sounds is played back, so that the user can obtain only a sound of interest, to prevent the user's obtaining of other sounds except the sound of interest. To some extent, a focus can be highlighted, so that the user can quickly respond to the sound of interest. The target sound in the embodiments is a sound corresponding to the sample sound in the external sounds. It may be understood that the sample sound in the sample sound library is relatively standard. However, if the external sounds contain the sample sound in the sample sound library corresponding to the scenario, the detected sound in the external sounds may be the same or similar to the sample sound in the sample sound library. Therefore, playing back the target sound corresponding to the sample sound in the external sounds enables a sound heard by the user to be closer to a sound transmitted in a real environment than playing the sample sound in the sample sound library, which may improve the authenticity of a sound perceived by the user, so as to improve the user experience. For example, if the sample sound in the sample sound library includes car horns, the external sounds contain the car horns, but the car horns in the external sounds are different from the car horns in the sample sound library, for example, the car horns in the external sounds also contain information about a distance between a car and the user or whether the car is a bus or a private car, therefore, multi-dimensional information of the target sound in the external sounds may be retained by playing back the target sound corresponding to the sample sound in the sample sound library in the external sounds, so as to improve the authenticity of the sound perceived by the user and improve the user experience.

Based on the contents disclosed in the above-mentioned embodiments, in the embodiments, prior to the step of playing back a target sound corresponding to the sample sound in the external sounds, the method further includes the following steps.

In S501, the target sound corresponding to the sample sound is separated from the external sounds.

In S502, a gain of the target sound is increased.

Figure 5:
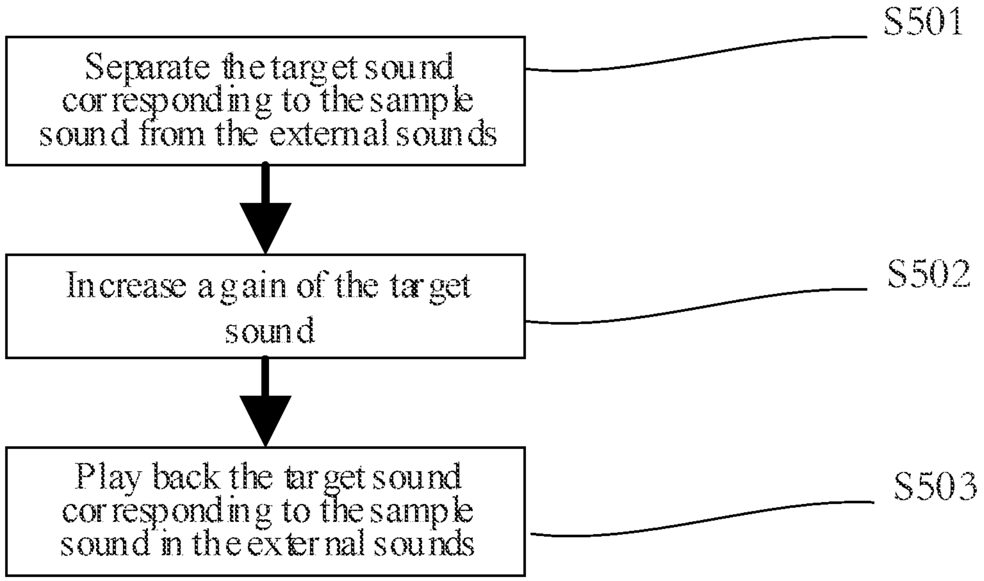
FIG. 5 is a flowchart of yet another hearing aid method for noise reduction according to an embodiment of the present disclosure.

As shown in FIG. 5, step 503 is the same as or similar to playing back a target sound corresponding to the sample sound in the external sounds in step S402 disclosed in the above-mentioned embodiments, which is not described in detail in the embodiments. In the embodiments, in order to play back the target sound corresponding to the sample sound in the external sounds, the target sound corresponding to the sample sound may be separated from the external sounds by using a speech separation technology, and then the separated target sound is played back. In addition, in the embodiments, for the separated target sound, step S502 may be performed to increase a gain of the target sound, so as to increase a volume of the target sound, so that the user can hear the target sound clearly and pay enough attention to it. Step S502 may be implemented by using a technology such as speech enhancement.

Based on the contents disclosed in the above-mentioned embodiments, in the embodiments, if the external sounds contain a plurality of sample sounds in the sample sound library corresponding to the scenario, the step of playing back a target sound corresponding to the sample sound in the external sounds includes: playing back the target sound corresponding to one of the plurality of sample sounds. In the embodiments, when the external sounds contain a plurality of sample sounds in the sample sound library corresponding to the scenario, if target sounds corresponding to the plurality of sample sounds are played back, the user hears a plurality of target sounds, which may cause the user to be distracted by each target sound and cause the user to ignore a more important target sound. For example, if the scenario where the user is located is identified as an outdoor scenario, sample sounds in a sample sound library corresponding to the outdoor scenario include a user name and car horns, in this case, if the external sounds contain the user name as well as the car horns, the user may not hear the user name or the car horns clearly if the user name and the car horns are played back at the same time. Therefore, when the external sounds contain a plurality of sample sounds in the sample sound library corresponding to the scenario, the target sound corresponding to one of the plurality of sample sounds may be played back, so that the user can hear at least one target sound clearly and the user can focus on one target sound.

Based on the contents disclosed in the above-mentioned embodiments, in the embodiments, the step of playing back the target sound corresponding to one of the plurality of sample sounds includes: selecting, if the external sounds contain a first sample sound and a second sample sound in the sample sound library corresponding to the scenario, the target sound corresponding to the first sample sound for playback according to the priorities of the first sample sound and the second sample sound, the priority of the first sample sound being higher than that of the second sample sound. In the embodiments, when the target sound corresponding to one of the plurality of sample sounds is played back, the target sound corresponding to which one sample sound is played back may be determined according to the priorities of the sample sounds. When the external sounds contain a plurality of sample sounds in the sample sound library corresponding to the scenario, the target sound corresponding to the sample sound with the highest priority in the plurality of sample sounds is selected for playback. For example, if the external sounds contain a first sample sound and a second sample sound in the sample sound library corresponding to the scenario, the target sound corresponding to the sample sound with a higher priority may be selected for playback according to the priorities of the first sample sound and the second sample sound. If the priority of the first sample sound is higher than that of the second sample sound, the target sound corresponding to the first sample sound is selected for playback. In an example, if the scenario where the user is located is identified as an outdoor scenario, and sample sounds in a sample sound literary corresponding to the outdoor scenario include a user name and car horns, in this case, if the external sounds contain the user name as well as the car horns, a target sound corresponding to the car horns with a higher priority may be selected for playback, so that the user can hear the car horns clearly, to arouse enough alertness. Therefore, when the external sounds contain a plurality of sample sounds in the sample sound library corresponding to the scenario, the target sound corresponding to the sample sound with a higher priority in the plurality of sample sounds may be played back, so that the user can hear only one target sound clearly and the user can focus on the target sound.

Based on the contents disclosed in the above-mentioned embodiments, in the embodiments, the sample sound includes one or more of ambient sounds, keywords or voiceprint information; the keywords include one or more of appellations or greetings; the ambient sounds include one or more of: alarms, crashes, explosions, building collapses, car horns or broadcasts. In the embodiments, the alarms listed in the ambient sounds include a variety of alarms such as tire alarms, also known as fire-fighting alarms, and earthquake warnings. The broadcasts may include a variety of broadcasts, such as airport broadcasts and subway broadcasts. Specific contents of the alarms, the crashes, the explosions, the building collapses, the car horns and the broadcasts are not limited in the embodiments. The appellations in the embodiments may be specific titles or nicknames, such as Boss, President, Headmaster, Lawyer, Lao Wang, Xiao Zhang and so on. The greetings may be hello, hi, and so on. In the embodiments, the sample sound may also be an appellation plus a greeting, for example, hi, Xiao Zhang. In the embodiments, a language type of the sample sound is not limited, which may be one or more of a plurality of languages. The voiceprint information in the embodiments may be a spectrum of sound waves carrying speech information that can be displayed by an electroacoustic instrument. Generally, the voiceprint information is different for each person. In some scenarios, the user may be required to pay special attention to the sound of one specific person. For example, when accompanying a patient in a ward, special attention is required to be paid to the patient's voice. If the sample sound in the sample sound library includes voiceprint information of the patient, the hearing aid mode may be turned on only when the patient produces a voice, while other people's voices cannot trigger the hearing aid mode, so as to prevent the disturbance of other patients to the user.

Based on the contents disclosed in the above-mentioned embodiments, in the embodiments, the scenario may include one or more of: an office scenario, a home scenario, an outdoor scenario or a travel scenario. However, the embodiments are not limited to the scenarios listed. Other scenarios may be customized by the system or the user may add other scenarios as required. For the office scenario, the ambient sound in the sample sound library corresponding to the scenario is one or more of: alarms, explosions, building collapses and broadcasts. The office scenario does not include car horns, which prevents the user's hearing uninterested sounds. For example, some users work in busy streets. If the floor is low, external voices acquired by the reference microphone may include car horns or crashes. In this case, when the users are at work, they are not willing to enter the hearing aid mode to hear the car horns or crashes. Therefore, the sample sound library corresponding to the office scenario not including the car horns can effectively improve the user experience. For the outdoor scenario and the travel scenario, the ambient sound in the sample sound library corresponding to the outdoor scenario or the travel scenario is one or more of: alarms, crashes, explosions, building collapses, car horns or broadcasts. The user, when in the outdoor scenario or the travel scenario, contacts more types of external sounds, and is required to enter the hearing aid mode in more cases. In order to ensure the safety of the user, the ambient sound in the target sample library is required to include a plurality of types of sample sounds. The ambient sound in the sample sound library corresponding to the home scenario is one or more of: alarms, explosions or building collapses. For the home scenario, the sample sound in the sample sound library corresponding to the home scenario may not include crashes, car horns and broadcasts. At home, if someone is watching TV or playing games, he/she may also hear such ambient sounds. The sample sound in the sample sound library does not include such ambient sounds, so that the user does not enter the hearing aid mode when not expecting to start the hearing aid mode, so as to improve the user experience. In the embodiments, other scenarios may also be included. Sample sounds in sample sound libraries corresponding to the scenarios may also be configured. In the embodiments, if the sample sound library does not include a certain sample sound, the sample sound may also be configured with the lowest priority in addition to not being configured in the sample sound library. For example, a weight or a parameter expressing the priority of the sample sound may be configured as zero. The lower the priority, the smaller the parameter, in this way, even if the external sounds contain the sample sound, since the sample sound has the lowest priority or the weight is zero, the hearing aid mode may be not be turned on.

In the embodiments, the scenario may include one or two of a static scenario and an exercise scenario. If the scenario where the user is located is identified as the exercise scenario, the sample heart rate in the sample heart rate library corresponding to the scenario may be set as a heart rate signal of more than 200 beats/min or less than 60 beats/min. In the exercise scenario, if the heart rate signal of the user belongs to the sample heart rate in the sample heart rate library corresponding to the scenario, that is, more than 200 beats/min or less than 60 beats/min, the hearing aid mode may be turned on, to make it easier for the user to communicate with people around when calling for help. If the scenario where the user is located is identified as the static scenario, for example, the user works at the desk or sleeps at home, the sample sound in the sample sound library corresponding to the static scenario may be more than 120 beats/min or less than 50 beats/min. In the static scenario, if the heart rate signal of the user belongs to the sample heart rate in the sample heart rate library corresponding to the scenario, that is, more than 120 beats/min or less than 50 beats/min, the hearing aid mode may be turned on, to make it easier for the user to communicate with people around when calling for help.

Based on the contents disclosed in the above-mentioned embodiments, in the embodiments, the priority of the ambient sound in the sample sound in the sample sound library corresponding to the scenario is higher than the priority/priorities of one or more of the keywords or the voiceprint information. For example, if the sample sound contains the ambient sound, the priority of the ambient sound may be set to be higher than that of the keywords or voiceprint information, so that the user can pay enough attention to the sound around that may cause danger. For example, when the external sounds contain car horns and a user name in the sample sound library, the priority of the ambient sound is higher. Therefore, after the hearing aid mode is entered, the car horns instead of the user name in the external sounds are played back, so that the user pays attention to the ambient sound that may cause danger. If the user is in the travel scenario, for example, such as on a high-speed train or an airplane, and broadcast information is relatively important, broadcasts may be configured with the highest priority, followed by sounds of conversation, and car horns are less likely to occur. Therefore, the car horns may be configured with the lowest priority or even be removed from the sample sound library. In the embodiments, the priorities of the plurality of ambient sounds may be the same or different. The priorities of the sample sounds belonging to the ambient sounds are not limited in the embodiments. The system may default the priorities of the sample sounds belonging to the ambient sounds, and/or the priorities of the sample sounds belonging to the ambient sounds may be adjusted by the user.

Figure 6:
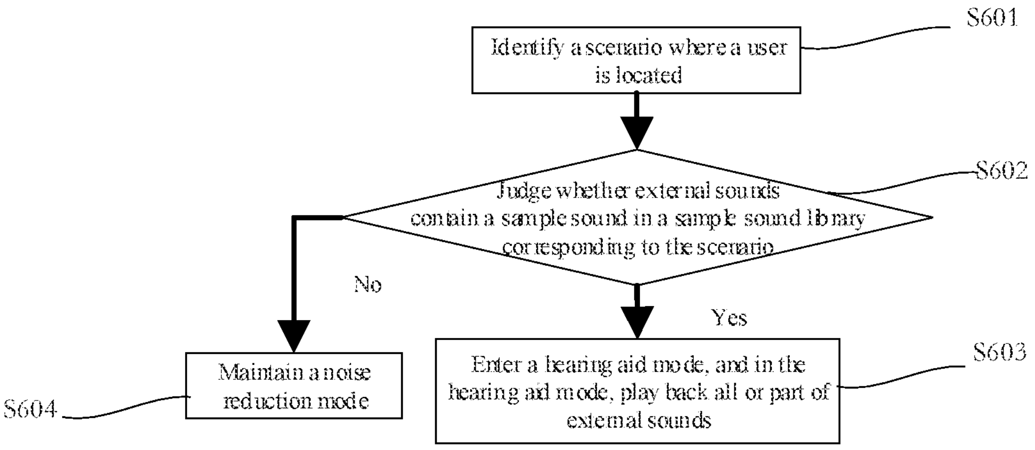
FIG. 6 is a flowchart of yet another hearing aid method for noise reduction according to an embodiment of the present disclosure.

Based on the contents disclosed in the above-mentioned embodiments, in the embodiments, subsequent to the step of identifying a scenario where a user is located, the method further includes judging whether the external sounds contain the sample sound in the sample sound library corresponding to the scenario. As shown in FIG. 6, after step S601, step S602 is performed, in which it is judged whether the external sounds contain the sample sound in the sample sound library corresponding to the scenario. Step S601 is the same as or similar to step S201 in the above-mentioned embodiments, and is not described in detail in the embodiments. In the embodiments, when judging whether the external sounds contain the sample sound in the sample sound library corresponding to the scenario, judgment accuracy may be selected according to an actual environment or a user requirement, which is not limited in the embodiments. A technology of judging whether the external sounds contain the sample sound in the sample sound library corresponding to the scenario may be a speech recognition or keyword recognition technology, which is not limited in the embodiments. When the external sounds contain the sample sound in the sample sound library corresponding to the scenario, step S603 is performed, in which a hearing aid mode is entered, and in the hearing aid mode, all or part of external sounds is played back. Step S603 in the embodiments is the same or similar to step S202 in the above-mentioned embodiments, and is not described in detail in the embodiments. When the external sounds do not contain the sample sound in the sample sound library corresponding to the scenario, step S604 is performed, in which a noise reduction mode is maintained so that the user is still in a quiet environment.

Figure 7:
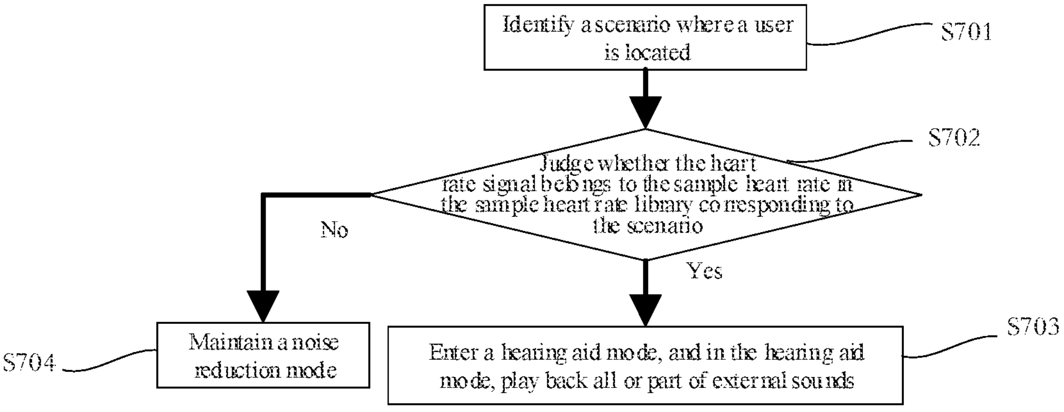
FIG. 7 is a flowchart of yet another hearing aid method for noise reduction according to an embodiment of the present disclosure.

In the embodiments, subsequent to the step of identifying a scenario where a user is located, the method may further include: judging whether the heart rate signal belongs to the sample heart rate in the sample heart rate library corresponding to the scenario. As shown in FIG. 7, after step S701, step S702 is performed, in which it is judged whether the heart rate signal belongs to the sample heart rate in the sample heart rate library corresponding to the scenario. Step S701 is the same as or similar to step S301 in the above-mentioned embodiments, and is not described in detail in the embodiments. In the embodiments, when judging whether the heart rate signal belongs to the sample heart rate in the sample heart rate library corresponding to the scenario, judgment accuracy may be selected according to an actual environment or a user requirement, which is not limited in the embodiments. When the heart rate signal belongs to the sample heart rate in the sample heart rate library corresponding to the scenario, step S703 is performed, in which a hearing aid mode is entered, and in the hearing aid mode, all or part of external sounds is played back. Step S703 in the embodiments is the same or similar to step S3202 in the above-mentioned embodiments, and is not described in detail in the embodiments. When the heart rate signal does not belong to the sample heart rate in the sample heart rate library corresponding to the scenario, step S704 is performed, in which a noise reduction mode is maintained so that the user is still in a quiet environment.

Based on the contents disclosed in the above-mentioned embodiments, in the embodiments, a weight of the sample sound is configured according to the priority of the sample sound, and the higher the priority of the sample sound, the greater the weight of the sample sound; and

- the step of judging whether the external sounds contain the sample sound in the sample sound library corresponding to the scenario includes:
- determining that the external sounds contain the sample sound in the sample sound library corresponding to the scenario if a cumulative sum of intensity of each sample sounds contained in the external sounds multiplied by a respective weight is greater than a preset value.

In the embodiments, when judging whether the external sounds contain the sample sound in the sample sound library corresponding to the scenario, the priority of the sample sound is also required to be taken into account. Each priority may be configured with a weight. For example, if the sample sound library includes three sample sounds, the sample sound with the highest priority may be configured with a weight of 1.0, the sample sound with the second highest priority may be configured with a weight of 0.5, and the sample sound with the lowest priority may be configured with a weight of 0.3. The priorities may be set by default, that is, may be initial values by default, or may be set or adjusted by the user, and this is not limited in the embodiments of the present disclosure. In some examples, intensity of the sample sound with the highest priority may be weak, so that it may be determined that the external sounds do not contain the sample sound in the sample sound library corresponding to the scenario, which may cause the user to miss more important information. For example, when the user accompanies a patient, if voiceprint information of the patient is set as the highest priority in the sample sound library, but the patient's voice is low, its intensity may not reach a preset value and the hearing aid mode cannot be triggered. In this case, if the weight of the sample sound is set to 1.5 or 2, intensity of the patient's voice multiplied by the weight may exceed the preset value to turn on the hearing aid mode. Alternatively, the weight of the voiceprint information of the patient is set to 1, the weight of the keyword is set to 0.5, a person nearby speaks the keyword in the sample sound to reminder the user that the patient is asking for help; then it may be judged, by adding the intensity of the keyword multiplied by the weight of the keyword to the intensity of the sound produced by the patient multiplied by the weight of the sound produced by the patient, that the external sounds contain the sample sound in the sample sound library corresponding to the scenario, so as to enter the hearing aid mode. In the embodiments, the cumulative sum refers to a sum of intensities of all the sample sounds contained in the external sounds multiplied by the corresponding weights. In the embodiments, the sample sound with the highest priority may be configured with a weight of 1.5, and the sample sound with the second highest priority may be configured with a weight of 1.0. Specific weight values are not limited in the embodiments. In some embodiments, when the sample sound library corresponding to the scenario includes only one sample sound, the sample sound may also be configured with a weight. For example, the weight is set to 1.5 or 0.5, to adjust the sensitivity of the judgment and adapt to requirements of different users or the same user in different scenarios.

Based on the contents disclosed in the above-mentioned embodiments, in the embodiments, the hearing aid method for noise reduction further includes: establishing the sample sound library corresponding to the scenario or establishing the sample heart rate library corresponding to the scenario. In the embodiments, a default sample sound library corresponding to the scenario or a default sample heart rate library corresponding to the scenario may be set prior to delivery of the headphones, or be set by the user. A default sample sound library corresponding to each scenario and a default sample heart rate library corresponding to each scenario may be set prior to delivery of the headphones. That is, the scenario and the sample sound library corresponding to the scenario may have an initial setting prior to delivery of the headphone, and the scenario and the sample heart rate library corresponding to the scenario may also have an initial setting prior to delivery of the headphone, which may also be adjusted by the user during the use. The time when the user sets each scenario and the corresponding sample sound library is not limited in the embodiments of the present disclosure. For example, the user may be reminded to set the time when the headphones are first paired with the phone, or, the user is reminded to set a scenario and a sample sound library corresponding to the scenario when the scenario where the user is located is identified. In addition, the user may also actively set the scenario and the sample sound library corresponding to the scenario on a mobile phone system or an APP.

Based on the contents disclosed in the above-mentioned embodiments, in the embodiments, the step of establishing the sample sound library corresponding to the scenario includes one or more of: inputting the sample sound to the sample sound library, deleting the sample sound, and adjusting the priority of the sample sound according to the scenario. In the embodiments, scenarios may also be added or deleted. When the user establishes the sample sound library corresponding to the scenario, the sample sound may be inputted. For example, the user may enter a keyword as a sample sound. For example, the user may customize keywords as Lao Zhang, Xiao Ming and other names, the user may also input an audio of a specific user to extract voiceprint information as a sample sound, and the user may also download various alarm sounds from the Internet as sample sounds. The inputting manner is not limited in the embodiments of the present disclosure. In the embodiments, the deleted sample sounds may be saved in the deleted sample sound library, in case the user uses the deleted sample sounds in the future, in this way, it can prevent the trouble of re-inputting, thereby simplifying an operation thereof. In the embodiments, if the sample sound is configured with a priority, the user may adjust the priority. For example, the priority ranked first may be moved to the second place, or the priority may be adjusted by setting the weight. The specific manner of adjusting the priority is not limited in the embodiments of the present disclosure.

Based on the contents disclosed in the above-mentioned embodiments, in the embodiments, the step of identifying a scenario where a user is located includes: identifying, according to one or more of an acceleration sensor, a temperature sensor, an air pressure sensor, a heart rate sensor, a GPS, or computer vision, the scenario where the user is located. Taking the GPS as an example, if the user turns on the GPS, it is easy to identify whether the user is in the home, office, or outdoor scenario. Taking the temperature sensor as an example, the outdoor scenario or the indoor scenario may be identified according to a difference between indoor and outdoor temperatures. In the embodiments, if the scenario cannot be accurately identified by only one manner, then more identification manners may be combined to complete identification of the scenario.

Based on the contents disclosed in the above-mentioned embodiments, in the embodiments, if the hearing aid mode is entered, a playback volume of all or part of external sounds is increased to a preset volume value within a preset time period when all or part of external sounds is played back. In the hearing aid mode, if all or part of external sounds is suddenly played back, the user's eardrum may be suddenly stimulated; besides, if all or part of external sounds is played at a high volume, the user experience may be poor. Therefore, when the hearing aid mode is entered, the playback volume of all or part of external sounds may be set to increase gradually. That is, within a preset time, the playback volume increases to a preset volume value. The preset time period may be 1 s or longer or shorter, and the length of the preset time period is not limited in the embodiments of the present disclosure. In the embodiments, the preset volume value may be set according to a user requirement, which, for example, may be set to be the same as an actual volume of the external sound, or set to be less than an actual volume of the external sound so as to protect the user's hearing, or set to be greater than an actual volume of the external sound for emphasis. This is not limited in the embodiments of the present disclosure.

Based on the contents disclosed in the above-mentioned embodiments, in the embodiments, in the hearing aid mode, noise reduction intensity of a noise reduction mode is maintained or reduced; and in the noise reduction mode, the external sounds are canceled by using an active noise reduction technology. In the embodiments, when the heating aid mode is entered, the noise reduction mode is still on, and the noise reduction intensity in the noise reduction mode may be maintained or reduced. The reduction of the noise reduction intensity in the noise reduction mode may be interpreted as reduction of a volume of a signal played back in the ears in a phase opposite to that of the external sound.

Figure 8:
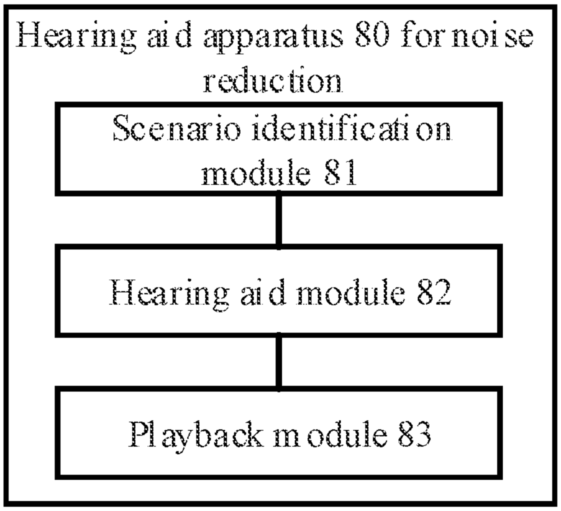
FIG. 8 is a schematic structural diagram of a hearing aid apparatus for noise reduction according to an embodiment of the present disclosure.

An embodiment of the present disclosure further provides a hearing aid apparatus for noise reduction, configured to perform the hearing aid method for noise reduction in the above embodiment. FIG. 8 is a schematic structural diagram of a hearing aid apparatus for noise reduction according to an embodiment of the present disclosure. The hearing aid apparatus 80 for noise reduction includes:

- a scenario identification module 81 configured to identify a scenario where a user is located;
- a hearing aid module 82 configured to, if detection data contains sample data in a sample database corresponding to the scenario, enter a hearing aid mode; and
- a playback module 83 configured to, in the hearing aid mode, play back all or part of external sounds, the external sounds being acquired by a reference microphone.

Optionally, the detection data is the external sounds, the sample database is a sample sound library, and the sample data is a sample sound; or the detection data is heart rate signals, the sample database is a sample heart rate library, and the sample data is a sample heart rate.

Optionally, different scenarios correspond to different sample sound libraries; or different scenarios correspond to different sample heart rate libraries.

Figure 8A:
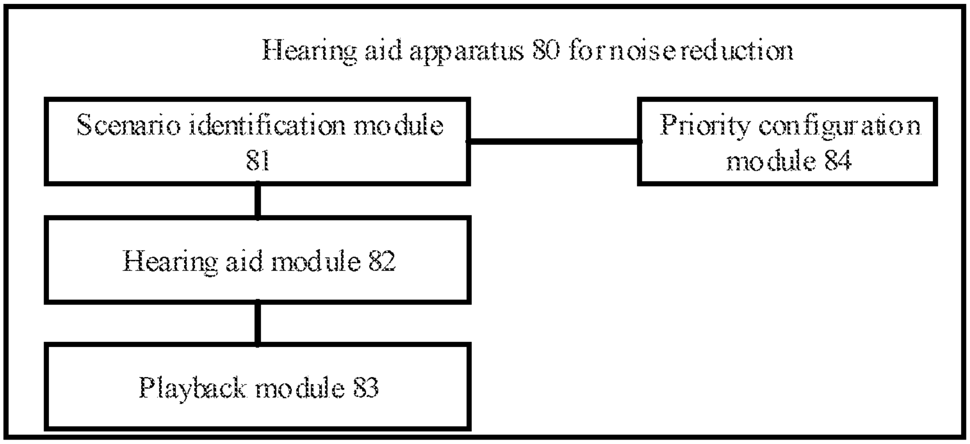
FIG. 8A is a schematic structural diagram of another hearing aid apparatus for noise reduction according to an embodiment of the present disclosure.

Optionally, referring to FIG. 8A, the hearing aid apparatus 80 for noise reduction further includes a priority configuration module 84 configured to configure priorities for the sample sounds in the sample sound libraries; the sample sounds in the sample sound libraries corresponding to different scenarios have different priorities.

Optionally, when playing back part of the external sounds, the playback module plays back a target sound corresponding to the sample sound in the external sounds.

Figure 8B:
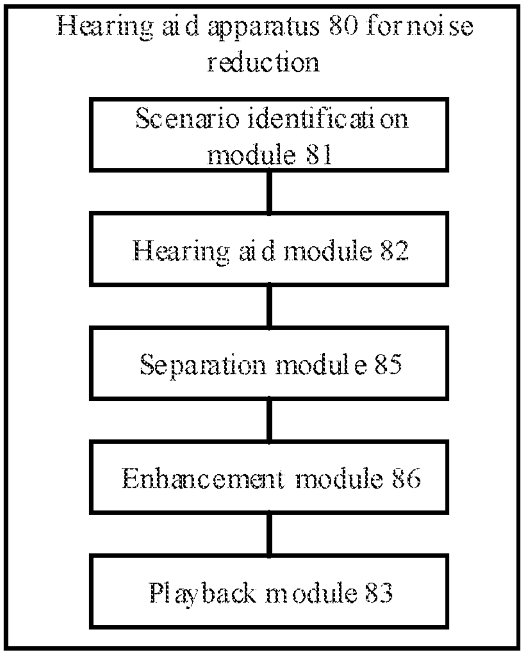
FIG. 8B is a schematic structural diagram of ye another hearing aid apparatus for noise reduction according to an embodiment of the present disclosure.

Optionally, referring to FIG. 8B, the hearing aid apparatus 80 for noise reduction further includes a separation module 85 and an enhancement module 86.

The separation module 85 and the enhancement module 86 are connected to the playback module 83.

The separation module 85 is configured to separate the target sound corresponding to the sample sound from the external sounds.

The enhancement module 86 is configured to increase a gain of the target sound.

Optionally, if the external sounds contain a plurality of sample sounds in the sample sound library corresponding to the scenario, when playing back a target sound corresponding to the sample sound in the external sounds, the playback module 83 plays back the target sound corresponding to one of the plurality of sample sounds.

Optionally, the playback module 83 plays back the target sound corresponding to one of the plurality of sample sounds. The playback module 83 selects, if the external sounds contain a first sample sound and a second sample sound in the sample sound library corresponding to the scenario, the target sound corresponding to the first sample sound for playback according to the priorities of the first sample sound and the second sample sound; the priority of the first sample sound being higher than that of the second sample sound.

Optionally, the sample sound includes one or more of: ambient sounds, keywords or voiceprint information, the keywords including one or more of appellations or greetings.

The ambient sounds include one or more of: alarms, crashes, explosions, building collapses, car horns or broadcasts.

Optionally, the scenario includes one or more of: an office scenario, a home scenario, an outdoor scenario or a travel scenario; or the scenario includes one or two of: a static scenario and an exercise scenario.

The ambient sound in the sample sound library corresponding to the office scenario includes one or more of: alarms, explosions, building collapses or broadcasts.

The ambient sound in the sample sound library corresponding to the outdoor scenario and the travel scenario includes one or more of: alarms, crashes, explosions, building collapses, car horns or broadcasts.

The ambient sound in the sample sound library corresponding to the home scenario includes one or more of: alarms, explosions, or building collapses.

The sample heart rate in the sample heart rate library corresponding to the exercise scenario includes a heart rate signal of more than 200 beats/min or less than 60 beats/min.

The sample heart rate in the sample heart rate library corresponding to the static scenario is a heart rate signal of more than 120 beats/min or less than 50 beats/min.

Optionally, the priority configuration module is further configured to configure the priority of the ambient sound in the sample sound in the sample sound library corresponding to the scenario to be higher than the priority/priorities of one or more of the keywords or the voiceprint information.

Figure 8C:
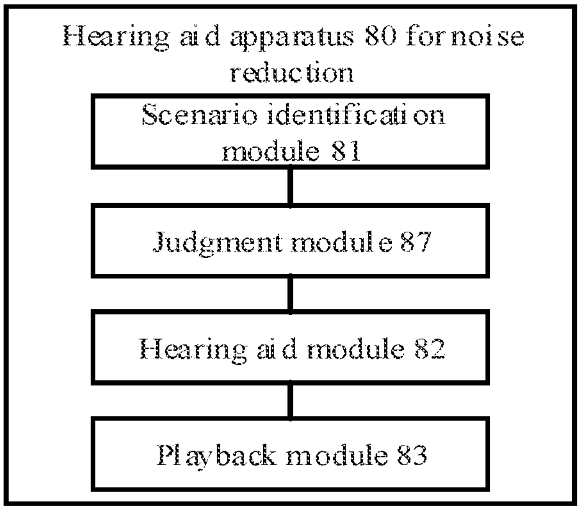
FIG. 8C is a schematic structural diagram of yet another hearing aid apparatus for noise reduction according to an embodiment of the present disclosure.

Optionally, referring to FIG. 8C, the hearing aid apparatus 80 for noise reduction further includes a judgment module 87.

The judgment module 87 is connected to the scenario identification module 81.

The judgment module 87 is configured to judge whether the external sounds contain the sample sound in the sample sound library corresponding to the scenario, or judge whether the heart rate signal belongs to the sample heart rate in the sample heart rate library corresponding to the scenario.

Optionally, the priority configuration module is further configured to configure a weight of the sample sound according to the priority of the sample sound, and the higher the priority of the sample sound, the greater the weight of the sample sound.

The judgment module determines that the external sounds contain the sample sound in the sample sound library corresponding to the scenario if a cumulative sum of intensity of each sample sound contained in the external sounds multiplied by a respective weight is greater than a preset value.

Figure 8D:
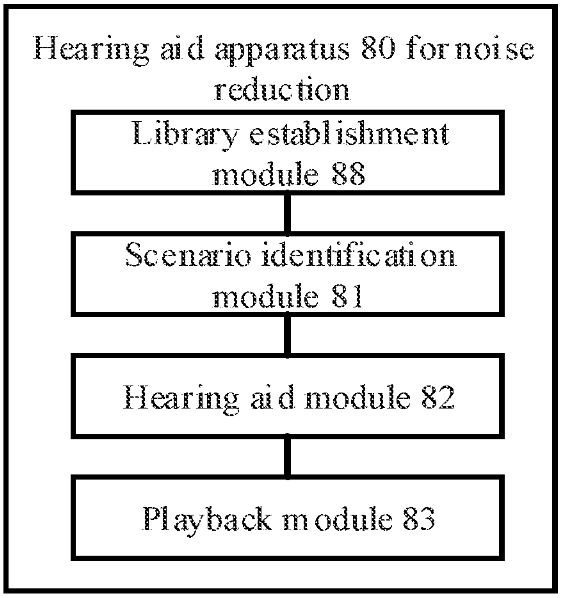
FIG. 8D is a schematic structural diagram of yet another hearing aid apparatus for noise reduction according to an embodiment of the present disclosure.

Optionally, referring to FIG. 8D, the hearing aid apparatus 80 for noise reduction further includes a library establishment module 88 configured to establish the sample sound library corresponding to the scenario or establish the sample heart rate library corresponding to the scenario.

The library establishment module 88 further includes one or more of: an input module, a deletion module or an adjustment module.

The input module, the deletion module and the adjustment module are respectively configured to input the sample sound to the sample sound library, delete the sample sound and adjust the priority of the sample sound according to the scenario; or the input module and the deletion module are respectively configured to input the sample heart rate to the sample heart rate library and delete the sample heart rate according to the scenario.

Optionally, a playback volume of all or part of external sounds played back by the playback module is increased to a preset volume value within a preset time period.

Figure 8E:
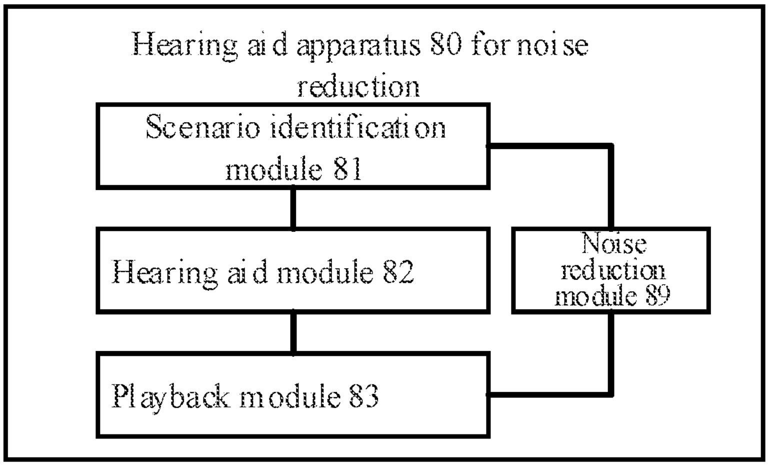
FIG. 8E is a schematic structural diagram of yet another hearing aid apparatus for noise reduction according to an embodiment of the present disclosure.

Optionally, referring to FIG. 8E, the hearing aid apparatus 80 for noise reduction further includes a noise reduction module 89. In the hearing aid mode, the noise reduction module 89 is configured to maintain or reduce noise reduction intensity of a noise reduction mode. In the noise reduction mode, the noise reduction module 89 is further configured to cancel the external sounds by using an active noise reduction technology.

The embodiments of the present disclosure provide a hearing aid apparatus for noise reduction, in which a scenario where a user is located is identified, and if detection data contains sample data in a sample database corresponding to the scenario, a hearing aid mode is entered to adapt to changes in the scenario where the user is located, as well as improve the user experience.

Figure 9:
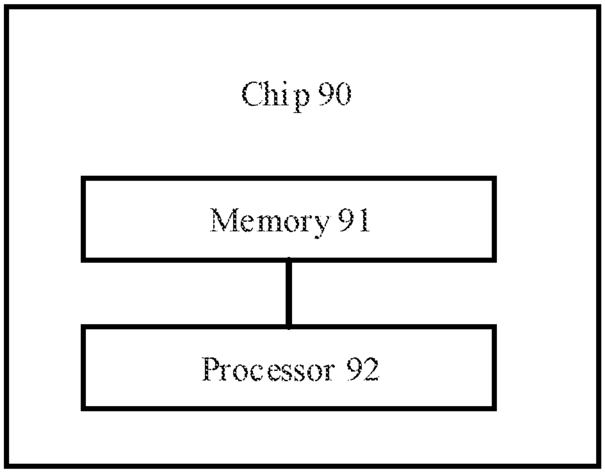
FIG. 9 is a schematic structural diagram of a chip according to an embodiment of the present disclosure.

The embodiments of the present disclosure may further provide a chip, configured to perform the hearing aid method for noise reduction according to any one of the above-mentioned embodiments. As shown in FIG. 9, a chip 90 includes a memory 91 and a processor 92.

The memory 91 is coupled to the processor 92.

The memory 91 is configured to store program instructions.

The processor 92 is configured to invoke the program instructions stored in the memory, to cause the chip to perform the hearing aid method for noise reduction according to any one of the above-mentioned embodiments.

A specific implementation process and beneficial effects of the chip according to the embodiments of the present disclosure may be obtained with reference to the above description, which are not described in detail herein.

Figure 10:
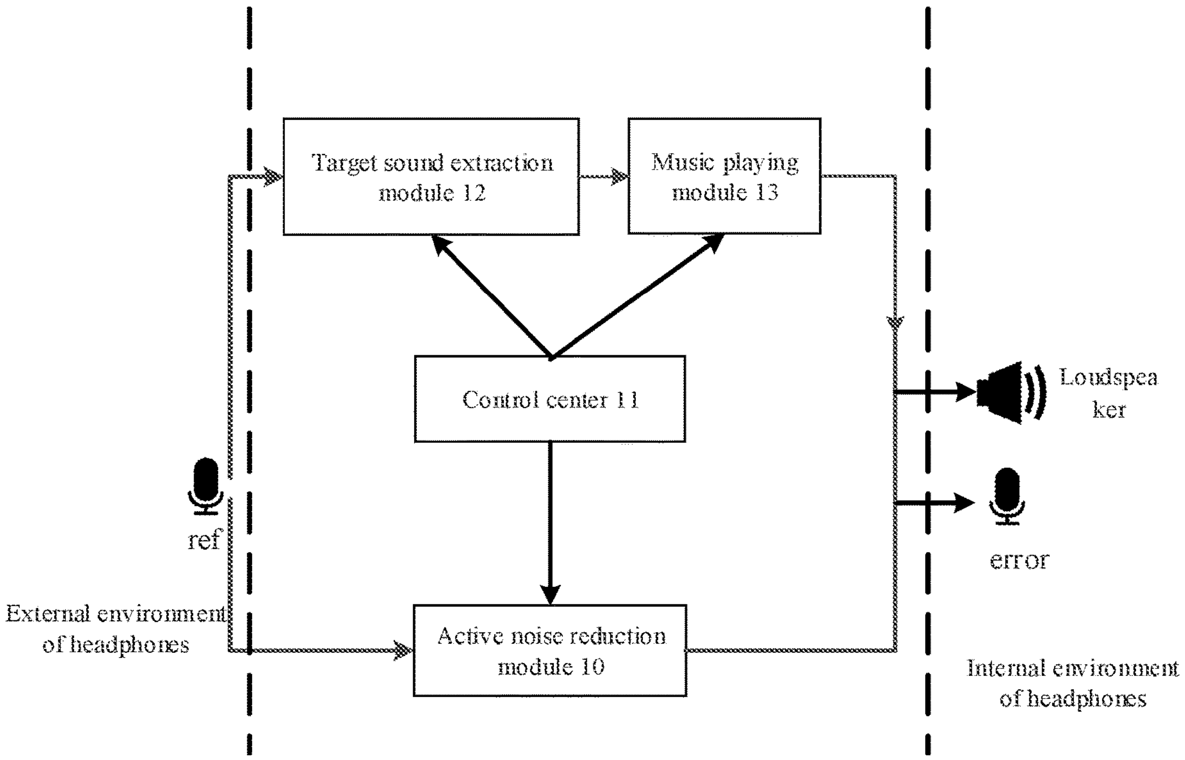
FIG. 10 is a schematic structural diagram of headphones according to an embodiment of the present disclosure.

The embodiments of the present disclosure may further provide headphones, including the chip according to any one of the above-mentioned embodiments. A specific implementation process and beneficial effects thereof may be obtained with reference to the above description, which are not described in detail herein. Referring to FIG. 10, in the embodiments, a reference microphone ref is provided outside the headphones. Data collected is transmitted in one way to be used in an active noise reduction module 10 for active noise reduction, and is transmitted in another way to a target sound extraction module 12 for signal processing. After processing, the data is sent to a music playing module 13 and played back in an inner loudspeaker of the headphones through a music channel. A control center 11 is configured to control the modules to implement the hearing aid method for noise reduction according to the above mentioned embodiments. The control center 11 may control switches and parameter adjustment of the modules, for example, select or adjust the noise reduction method or filter parameters of the active noise reduction module 10. The embodiments are illustrated with an example in which the control center is on the headphones. However, the control center 11 may also be on the headphones or a mobile phone. In the embodiments, the target sound extraction module 12 extracts a target sound through a technology such as signal separation, filtering or voice enhancement, and transmits the target sound to the music playing module, so that the target sound and music may be played at the same time. If the music is not played, it is possible to play back only the external sound. In the embodiments, the target sound may be understood as a to-be-played external sound, that is, all or part of external sounds in the above-mentioned embodiments, or the target sound corresponding to the sample sound in the external sounds. The active noise reduction module may be of a feedforward (FF), feedback (FB) or hybrid structure. The music playing module 13 is mainly configured to transmit an audio signal sent by a mobile phone. In the embodiments, the headphones may also include an error microphone error. The error microphone and the loudspeaker are both arranged in an in-ear environment. The embodiments of the present disclosure may further provide a computer-readable storage medium, including a computer program. When the computer program is executed by a processor, the hearing aid method for noise reduction according to any one of the above-mentioned embodiments is performed. A specific implementation process and beneficial effects thereof may be obtained with reference to the above description, which are not described in detail herein.

It is to be noted that the above method embodiments of the present disclosure may be applied to a processor or implemented by a processor. The processor may be an integrated circuit chip with signal processing capability. During the implementation, the steps of the above-mentioned method embodiments may be accomplished by an integrated logic circuit of hardware in the processor or by instructions in the form of software. The processor may be a general-purpose processor, a digital signal processor (DSP), an application specific integrated circuit (ASIC), a FIELD PROGRAMMABLE GATE ARRAY (FPGA) or other programmable logic device, a discrete gate or a transistor logic device, or a discrete hardware component. The methods, steps and logical block diagrams disclosed in the embodiments of the present disclosure may be implemented or executed. The general-purpose processor may be a microprocessor, or the processor may be any conventional processor or the like. The steps of the methods disclosed in the embodiments of the present disclosure may be directly implemented by a hardware decoding processor, or may be implemented by a combination of hardware and a software module in a decoding processor. The software module may be arranged in a storage medium that is mature in the art, such as a random access memory, a flash memory, a read-only memory, a programmable read-only memory or an electrically erasable programmable memory, or a register. The storage medium is arranged in the memory. The processor reads information in the memory and completes, together with hardware of the processor, the steps of the foregoing methods.

It may be understood that the memory in the embodiments of the present disclosure may be a volatile memory or a non-volatile memory, or may include a volatile memory and a non-volatile memory. The non-volatile memory may be a read-only memory (ROM), a programmable rom (PROM), an erasable prom (EPROM), an electrically EPROM (EEPROM), or a flash memory. The volatile memory may be a random access memory (RAM), used as an external high-speed cache. By way of illustration and no limitation, the RAM is available in a variety of forms, such as a static RAM (SRAM), a dynamic RAM (DRAM), a synchronous DRAM (SDRAM), a dual data rate SDRAM (DDR SDRAM), an enhanced SDRAM (ESDRAM), a synchlink DRAM (SLDRAM), and a direct rambus RAM (DR RAM). It is to be noted that the memory of the systems and methods described herein is intended to include, but not limited to, these and any other suitable types of memory.

It is to be understood that, in the embodiments of the present disclosure, "B corresponding to A" indicates that B is associated with A. B may be determined according to A. However, it is to be further understood that determining B according to A does not mean determining B only according to A, and may also mean determining B according to A and/or other information.

In addition, the term "and/or" herein describes an association relationship between associated objects and represents that three relationships may exist. For example, A and/or B may represent the following three cases: only A exists, both A and B exist, and only B exists. In addition, the character "/" generally indicates an "or" relationship between the associated objects.

Those of ordinary skill in the art should be aware that, in combination with the examples described in the embodiments disclosed herein, units and algorithm steps can be implemented by hardware or a combination of hardware and computer software. Whether a function is performed by hardware or software depends on particular applications and design constraints of the technical solutions. Those skilled in the art may use different methods to implement the described functions for each particular application, but it shall not be considered that the implementation goes beyond the scope of the present disclosure.

It may be clearly understood by those skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present disclosure, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

The function may be stored in a computer-readable storage medium when implemented in the form of the software functional unit and sold or used as an independent product. Based on such an understanding, the technical solutions in the present disclosure essentially, or the part contributing to the prior art, or some of the technical schemes may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program codes, such as a USB flash drive, a removable hard disk, a read-only memory (read-only memory, ROM), a random access memory (random access memory, RAM), a magnetic disk, or an optical disc.

The foregoing descriptions are merely some embodiments of the present disclosure, but are not intended to limit the protection scope of the present disclosure. Any variation or replacement readily figured out by those skilled in the art within the technical scope disclosed in the present disclosure shall fall within a protection scope of the present disclosure. Therefore, the protection scope of the present disclosure shall be subject to the protection scope defined by the claims.

What is claimed is:

1. A hearing aid method for noise reduction, comprising:
identifying a scenario where a user is located; and
entering a hearing aid mode when detection data acquired from a sensor contains sample data in a sample database corresponding to the scenario, and playing back all or part of external sounds in the hearing aid mode;
wherein the external sounds are acquired by a reference microphone; the sample database is a sample sound library, and the sample data is a sample sound; different scenarios correspond to different sample sound libraries;
wherein the sample sounds in respective sample sound libraries are configured with priorities; and the sample sounds in the sample sound libraries corresponding to different scenarios have different priorities;
wherein subsequent to identifying a scenario where a user is located, the hearing aid method further comprises: judging whether the external sounds contain the sample sound in the sample sound library corresponding to the scenario; and
wherein a weight of the sample sound is configured based on the priority of the sample sound, and the higher the priority of the sample sound, the greater the weight of the sample sound; and wherein said judging whether the external sounds contain the sample sound in the sample sound library corresponding to the scenario comprises: determining that the external sounds contain the sample sound in the sample sound library corresponding to the scenario based on that a cumulative sum of intensity of each sample sound contained in the external sounds multiplied by a respective weight is greater than a preset value.

2. The hearing aid method for noise reduction according to claim 1, wherein said playing back part of external sounds comprises:
playing back a target sound corresponding to the sample sound in the external sounds.

3. The hearing aid method for noise reduction according to claim 2, prior to playing back a target sound corresponding to the sample sound in the external sounds, further comprising:
separating the target sound corresponding to the sample sound from the external sounds; and
increasing a gain of the target sound.

4. The hearing aid method for noise reduction according to claim 2, wherein based on that the external sounds contain a plurality of sample sounds in the sample sound library corresponding to the scenario, said playing back a target sound corresponding to the sample sound in the external sounds comprises:
playing back the target sound corresponding to one of the plurality of sample sounds.

5. The hearing aid method for noise reduction according to claim 4, wherein said playing back the target sound corresponding to one of the plurality of sample sounds comprises:

selecting, based on that the external sounds contain a first sample sound and a second sample sound in the sample sound library corresponding to the scenario, the target sound corresponding to the first sample sound for playback based on the priorities of the first sample sound and the second sample sound; wherein the priority of the first sample sound is higher than that of the second sample sound.

6. The hearing aid method for noise reduction according to claim 1, further comprising: establishing the sample sound library corresponding to the scenario;

wherein said establishing the sample sound library corresponding to the scenario comprising one of more of: inputting the sample sound to the sample sound library, deleting the sample sound, and adjusting the priority of the sample sound based on the scenario.

7. The hearing aid method for noise reduction according to claim 1, further comprising:

in response to the hearing aid mode being entered, increasing a playback volume of all or part of external sounds to a preset volume value within a preset time period when playing back all or part of external sounds.

8. The hearing aid method for noise reduction according to claim 1, wherein in the hearing aid mode, noise reduction intensity of a noise reduction mode is maintained or reduced; and in the noise reduction mode, the external sounds are canceled by using an active noise reduction technology.

9. A hearing aid apparatus for noise reduction, comprising:

at least one processor; and a memory configured to store instructions executable by the at least one processor;

wherein the instructions cause the at least one processor to:

identify a scenario where a user is located;

enter a hearing aid mode when detection data acquired from a sensor contains sample data in a sample database corresponding to the scenario;

wherein the sample database is a sample sound library, and the sample data is a sample sound; different scenarios correspond to different sample sound libraries;

play back all or part of external sounds in the hearing aid mode; wherein the external sounds are acquired by a reference microphone; and configure priorities for the sample sounds in the sample sound libraries, wherein the sample sounds in the sample sound libraries corresponding to different scenarios have different priorities, wherein subsequent to identifying a scenario where a user is located, the at least one processor is further configured to judge whether the external sounds contain the sample sound in the sample sound library based on the scenario, and the at least one processor is further configured to configure a weight of the sample sound according to the priority of the sample sound, and the higher the priority of the sample sound, the greater the weight of the sample sound; and wherein said judging whether the external sounds contain the sample sound in the sample sound library corresponding to the scenario comprises: determining that the external sounds contain the sample sound in the sample sound library corresponding to the scenario if a cumulative sum of intensity of each sample sound contained in the external sounds multiplied by a respective weight is greater than a preset value.

10. The hearing aid apparatus for noise reduction according to claim 9, wherein when playing back part of the external sounds, the at least one processor is further configured to play back a target sound corresponding to the sample sound in the external sounds.

11. The hearing aid apparatus for noise reduction according to claim 10, wherein the at least one processor is further configured to separate the target sound corresponding to the sample sound from the external sounds, and increase a gain of the target sound.

12. The hearing aid apparatus for noise reduction according to claim 10, wherein, based on that the external sounds contain a plurality of sample sounds in the sample sound library corresponding to the scenario, when playing back a target sound corresponding to the sample sound in the external sounds, the at least one processor is further configured to play back the target sound corresponding to one of the plurality of sample sounds.

13. The hearing aid apparatus for noise reduction according to claim 12, wherein when playing back the target sound corresponding to one of the plurality of sample sounds, the at least one processor is further configured to select, based on that the external sounds contain a first sample sound and a second sample sound in the sample sound library corresponding to the scenario, the target sound corresponding to the first sample sound for playback based on the priorities of the first sample sound and the second sample sound; and the priority of the first sample sound being higher than the priority of the second sample sound.

14. The hearing aid apparatus for noise reduction according to claim 9, wherein the at least one processor is further configured to establish the sample sound library corresponding to the scenario; and wherein the at least one processor is further configured to input the sample sound to the sample sound library, delete the sample sound and adjust the priority of the sample sound according to the scenario.

15. The hearing aid apparatus for noise reduction according to claim 9, wherein the at least one processor is further configured to increase a playback volume of all or part of external sounds to a preset volume value within a preset time period.

16. The hearing aid apparatus for noise reduction according to claim 9, wherein the at least one processor is further configured to maintain or reduce noise reduction intensity of a noise reduction mode in the hearing aid mode, and cancel the external sounds by using an active noise reduction technology in the noise reduction mode.

* * * * *